(12) United States Patent
Kim et al.

(10) Patent No.: US 12,018,815 B2
(45) Date of Patent: Jun. 25, 2024

(54) LIGHT SOURCE MODULE, LIGHTING DEVICE, AND EQUIPMENT SYSTEM

(71) Applicant: LG ELECTRONICS INC., Seoul (KR)

(72) Inventors: Bongho Kim, Seoul (KR); Dongjune Choi, Seoul (KR); Jihoon Park, Seoul (KR); Hyountag Oh, Seoul (KR); Jinbeom Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/999,012

(22) PCT Filed: May 20, 2020

(86) PCT No.: PCT/KR2020/006609
§ 371 (c)(1),
(2) Date: Nov. 16, 2022

(87) PCT Pub. No.: WO2021/235571
PCT Pub. Date: Nov. 25, 2021

(65) Prior Publication Data
US 2023/0228402 A1     Jul. 20, 2023

(51) Int. Cl.
*F21V 13/04*      (2006.01)
*F21V 7/09*       (2006.01)
(Continued)

(52) U.S. Cl.
CPC .............. *F21V 13/04* (2013.01); *F21V 7/09* (2013.01); *F21V 7/28* (2018.02); *F21V 17/06* (2013.01)

(58) Field of Classification Search
CPC ... F21V 13/04; F21V 7/28; F21V 7/09; F21V 17/06; F21V 7/04; F21V 7/00; F21V 7/0008; F21V 21/03; F21V 21/02
See application file for complete search history.

(56) References Cited

U.S. PATENT DOCUMENTS 4,037,096 A * 7/1977 Brendgord ............ F21V 7/0008
                                                 362/294
4,112,483 A * 9/1978 Small, Jr. ................. F21V 7/24
                                                 362/346
(Continued)

FOREIGN PATENT DOCUMENTS

JP          08-67026         3/1996
JP        2013-048087        3/2013
(Continued)

OTHER PUBLICATIONS

PCT International Application No. PCT/KR2020/006609, International Search Report dated Feb. 15, 2021, 4 page.

*Primary Examiner* — Bao Q Truong
(74) *Attorney, Agent, or Firm* — LEE, HONG, DEGERMAN, KANG & WAIMEY (57) ABSTRACT

Provided are a light source module, a lighting device, and a system, which have uniform illuminance distribution, can obtain light having a large area, and are easy to assemble. The light module includes: a light source for emitting light; and a modulator disposed below the light source so as to modulate the emitted light into a line beam in the vertical direction. The light device includes a body, and a plurality of light source modules disposed on the lower side of the body so as to be arranged in an array in the horizontal direction, wherein the light source module includes: a support member provided in a first area of the lower side of the body; a light source provided in a second area of the lower side of the body so as to emit light in the downward direction; and the modulator provided on the lower side of the support member so as to modulate the emitted light into the line beam in the vertical direction.

18 Claims, 10 Drawing Sheets

(51) Int. Cl.
 *F21V 7/28* (2018.01)
 *F21V 17/06* (2006.01)

(56) References Cited

U.S. PATENT DOCUMENTS

| | | | |
|---|---|---|---|
| 5,521,748 A | 5/1996 | Sarraf | |
| 8,197,105 B2 * | 6/2012 | Yang | F21S 8/033 |
| | | | 362/217.05 |
| 9,709,244 B2 * | 7/2017 | Liu | F21V 7/09 |
| 10,648,626 B2 * | 5/2020 | Hwang | F21V 7/09 |
| 2013/0016410 A1 | 1/2013 | Futterer | |

FOREIGN PATENT DOCUMENTS

| | | |
|---|---|---|
| JP | 2019-059993 | 4/2019 |
| KR | 10-1891756 | 8/2018 |
| KR | 10-1916788 | 1/2019 |

\* cited by examiner

LIGHT SOURCE MODULE, LIGHTING DEVICE, AND EQUIPMENT SYSTEM

CROSS-REFERENCE TO RELATED APPLICATION(S)

This application is the National Stage filing under 35 U.S.C. 371 of International Application No. PCT/KR2020/006609, filed on May 20, 2020, the contents of which are all hereby incorporated by reference herein in their entireties.

TECHNICAL FIELD

Embodiments relate to a light source module, a lighting device and an equipment system.

BACKGROUND ART

Lighting devices that emit light are widely used in various industrial fields.

The light of the lighting device has a Lambertian illuminance distribution.

Figure 1:
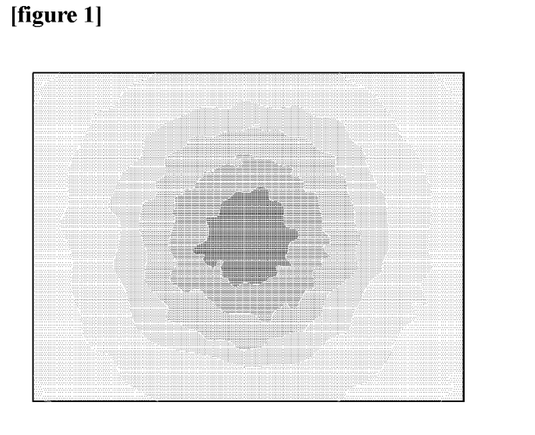
FIG. 1 shows an illuminance distribution of a conventional lighting device.

As shown in FIG. 1, illuminance of a center is strongest, and illuminance is weaker toward the periphery. In addition, as shown in FIG. 1, since light from the lighting device is normally emitted in all directions, it has a circular illuminance distribution.

However, in various devices using light from a lighting device, light having a uniform illuminance distribution in a rectangular shape and a large area size is required. Therefore, it is urgent to develop a lighting device to meet the needs of these various industrial fields.

INVENTION

Technical Problem

Embodiments provide a light source module, a lighting device, and an equipment system capable of obtaining light having a uniform illuminance distribution.

Embodiment provide a light source module, a lighting device, and an equipment system capable of obtaining light having a large area size.

Embodiment provide a light source module, a lighting device, and an equipment system that are easily assembled.

Embodiment provide a light source module, a lighting device, and an equipment system applicable to various fields.

Technical Solution

According to an aspect of an embodiment, a light source module comprises a light source configured to emit light, and a modulator disposed below the light source to modulate the emitted light into a line beam in a vertical direction.

According to another aspect of an embodiment, a lighting device comprises a body, and a plurality of light source modules disposed below the body and arranged in an array in a horizontal direction. The light source module comprises a support member installed in a first region below the body, a light source installed in a second region below the body to emit light in a downward direction, and a modulator installed below the support member to modulate the emitted light into a line beam in a vertical direction.

According to another aspect of an embodiment, an equipment system comprises the lighting device.

Effect of the Invention

The light source module, the lighting device, and the equipment system according to the embodiment may have the following effects.

According to at least one of the embodiments, there is an advantage that a line beam having a uniform illuminance distribution in a vertical direction can be formed by a single light source module.

According to at least one of the embodiments, there is an advantage that light having a uniform illuminance distribution and a large area size can be obtained in a horizontal direction and a vertical direction by a plurality of light source modules arranged in an array in a horizontal direction.

According to at least one of the embodiments, there is an advantage in that a defect such as a vertical spotted pattern can be prevented by providing a diffusion unit in the first half of a plurality of light source modules.

According to at least one of the embodiments, since a light source module can be modularized, there is an advantage in that it is possible to reduce costs and improve productivity by easily assembling a plurality of modular light source modules as described above.

Further scope of applicability of the embodiments will become apparent from the following detailed description. However, it should be understood that the detailed description and specific embodiments, such as preferred embodiments, are given by way of example only, since various changes and modifications within the spirit and scope of the embodiments may be clearly understood by those skilled in the art.

BEST MODE

Hereinafter, preferred embodiments of the present invention will be described in detail with reference to the accompanying drawings. However, the technical spirit of the present invention is not limited to some embodiments described, but may be implemented in various different forms, and one or more of the components of the embodiments may be selectively combined or substituted within the scope of the technical spirit of the present invention. In addition, terms (including technical and scientific terms) used in the embodiments of the present invention may be interpreted to have the meaning generally understood by those of ordinary skill in the art to which the present invention belongs, unless specifically defined and described explicitly, and commonly used terms such as terms defined in the dictionary may be interpreted in consideration of the contextual meaning of the related technology. In addition, the terms used in the embodiments of the present invention are for describing the embodiments and are not intended to limit the present invention. In the present specification, the singular forms are intended to include the plural forms as well, unless the context clearly indicates otherwise, and, when it is described as "at least one (or more than one) of B and C", it may include one or more of all combinations of A, B, and C. In addition, in describing the components of the embodiment of the present invention, terms such as first, second, A, B, (a), (b), etc. may be used. These terms are only for distinguishing the component from other components, and are not limited to the essence, order, or sequence of the components by the term. In addition, when it is described that a component is 'connected', 'coupled' or 'linked' to another component, the component is not only directly connected, coupled or linked to the other component, but also is 'connected', 'coupled' or 'linked' to the other component via a further element interposed therebetween. In addition, when it is described as being formed or disposed "above or below" each component, above or below includes not only the case where two components are in direct contact with each other, but also the case where one or more others component are formed or disposed between two components. In addition, when expressed as "above or below", it may include the meaning of not only the upward direction but also the downward direction based on one component.

[Lighting Device]

Figure 2:
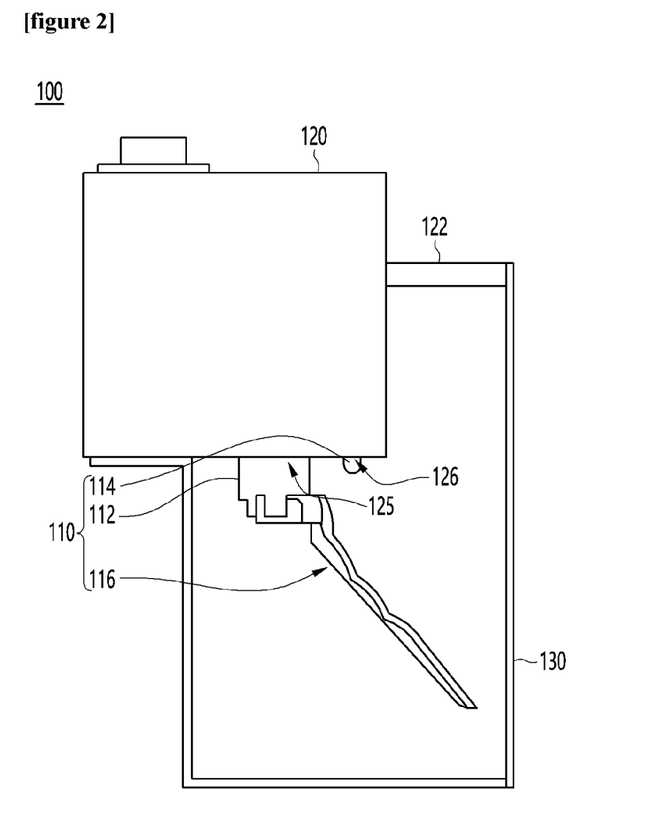
FIG. 2 is a side view showing a lighting device according to an embodiment.
Figure 3:
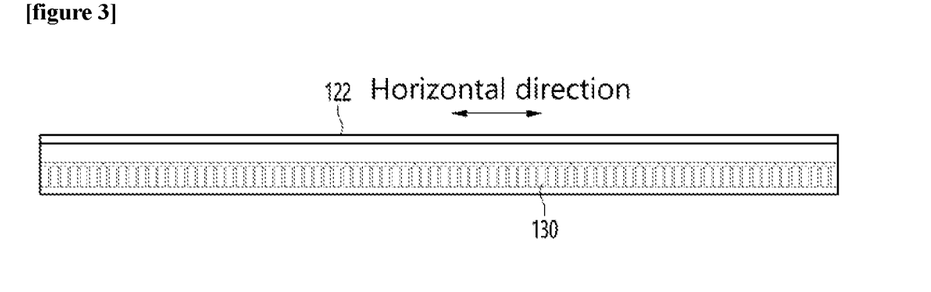
FIG. 3 is a front view showing a lighting device according to an embodiment.

FIG. 2 is a side view showing a lighting device according to an embodiment. FIG. 3 is a front view showing a lighting device according to an embodiment.

Referring to FIGS. 2 and 3, the lighting device 100 according to the embodiment may include a body 120 and a plurality of light source modules 110 disposed below the body 120. The lighting device 100 according to the embodiment may include more components, but is not limited thereto.

<Body 120>

The light source module 110 may be installed below the body 120. A housing 122 may be installed in the body 120. The body 120 may have a rectangular shape having a major axis long in a horizontal direction.

The housing 122 may surround the light source module 110. The body 120 and the housing 122 may be formed of a material having high strength, high durability, and high heat resistance. For example, the body 120 and the housing 122 may be formed of a plastic material, but is not limited thereto.

<Light Source Module 110>

The plurality of light source modules 110 may be arranged in an array along the horizontal direction. Each light source module 110 may be installed below the body 120. The light source modules 110 may be arranged side by side in the horizontal direction below the body 120. The light source modules 110 may be disposed adjacent to each other. For example, the light source modules 110 may contact each other, but are not limited thereto.

Each light source module 110 may include a support member 112, a light source 114, and a modulator 116. Each light source module 110 may include more components, but is not limited thereto.

The lower side of the body 120 may have a first region 125 and a second region 126. The first region 125 may be a region in which the support member 112 will be installed, and the second region 126 may be a region in which the light source 114 will be installed. The first region 125 and the second region 126 may be spaced apart from each other. The second region 126 may be defined below the body 120 adjacent to one side of the body 120. The first region 125 may be defined farther from one side of the body 120 than the second region 126.

The support member 112 may be installed in the first region 125 below the body 120. The light source 114 may be installed in the second region 126 below the body 120.

Figure 12:
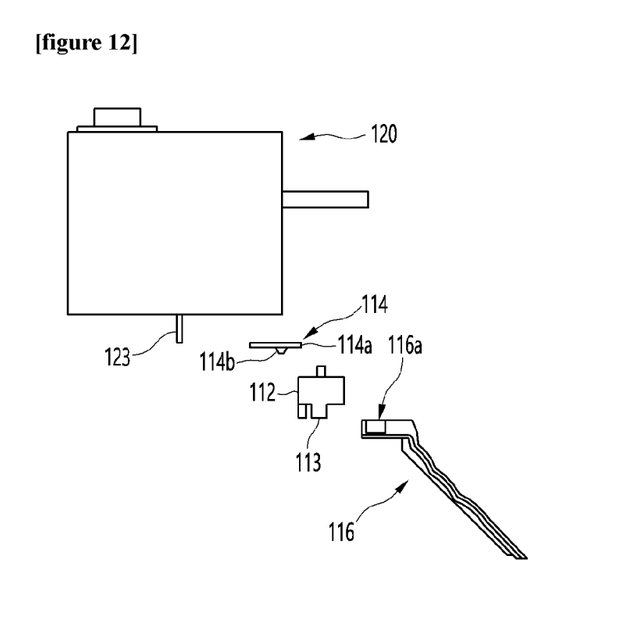
FIG. 12 is an exploded view of the lighting device of FIG. 2.

The light source 114 may be a member that emits light. As shown in FIG. 12, the light source 114 may include a light emitting element 114b and a printed circuit board 114a. The printed circuit board 114a may include a circuit pattern (not shown). The printed circuit board 114a may be installed in the second region 126 below the body 120. For example, the printed circuit board 114a may be installed in the second region 126 below the body 120 using a fastening means such as a bolt, but is not limited thereto. The light emitting element 114b may be mounted on the printed circuit board 114a. The light emitting element 114b may be electrically connected to the circuit pattern of the printed circuit board 114a to receive power to emit light.

The light emitting element 114b may include, for example, a light emitting diode capable of emitting infrared light, but is not limited thereto. The light emitting element 114b may include at least one light emitting element 114b. At least one light emitting element 114b may emit light with the same wavelength or light with different wavelengths.

The light emitting element 114b may be mounted on the lower side of the printed circuit board 114a to emit light in a downward direction.

Although not shown, the support member 112 may be integrally formed with the body 120.

The modulator 116 may be installed below the support member 112. The modulator 116 may modulate the light of the light emitting element 114b into a line beam in a vertical direction.

Figure 7:
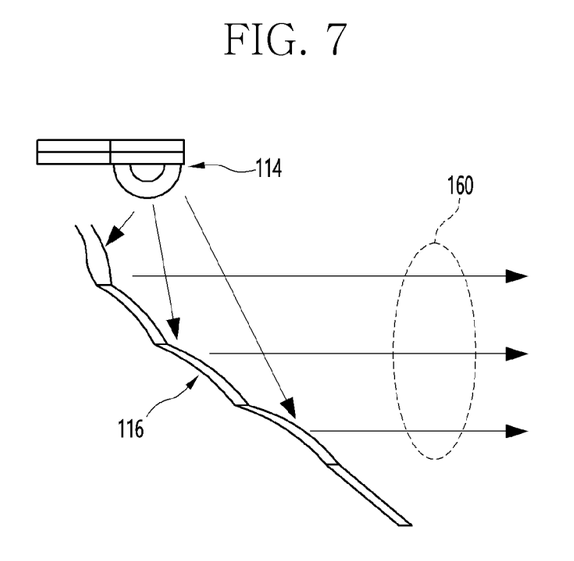
FIG. 7 shows the progress of light in the light source module of FIG. 2.

As shown in FIG. 7, when the light of the light emitting element 114b is emitted in the downward direction, the modulator 116 modulates light emitted in the downward direction into a line beam 160 in the vertical direction and transmits it forward.

Figure 8:
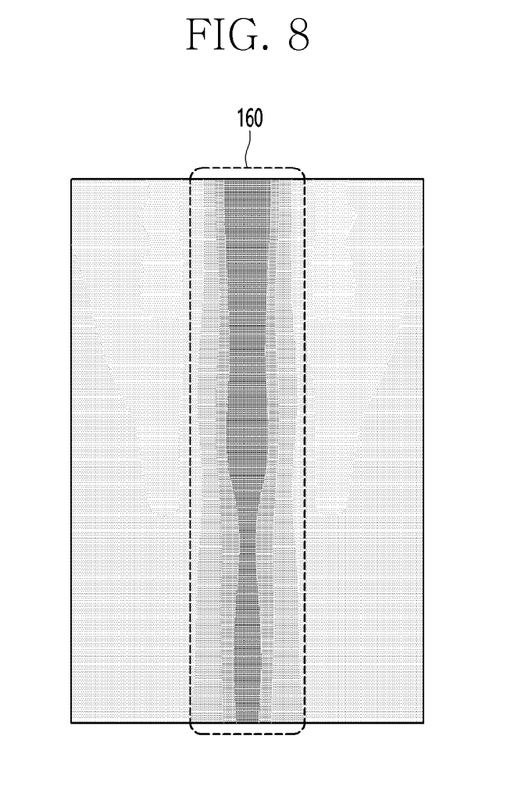
FIG. 8 shows an illuminance distribution of the light source module of FIG. 2.

The transmitted line beam 160 can be seen as shown in FIG. 8. That is, a line beam 160 having a very narrow horizontal width and a very long vertical length may be formed.

Accordingly, since a line beam 160 shown in FIG. 8 is formed by one light source module 110, a plurality of light source modules 110 are arranged in an array in the horizontal direction so that a single line beam 160 is arranged in the horizontal direction, thereby obtaining light of a large area size.

Figure 9A:
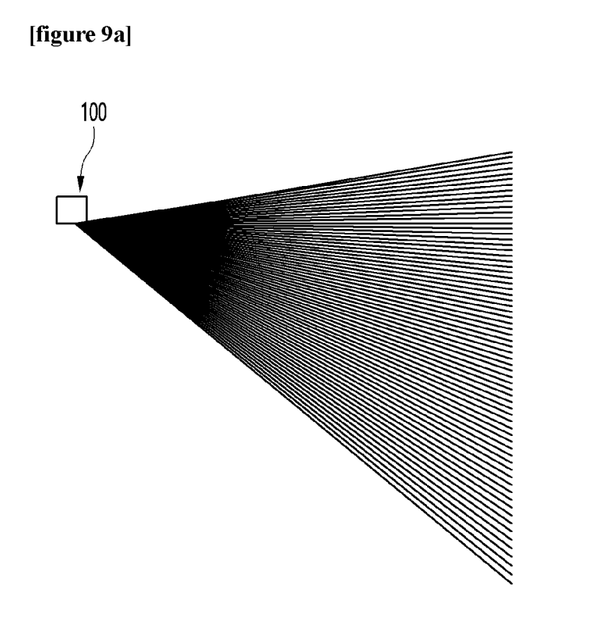
FIG. 9A shows a side view of the progress of light of a lighting device according to an embodiment.
Figure 9B:
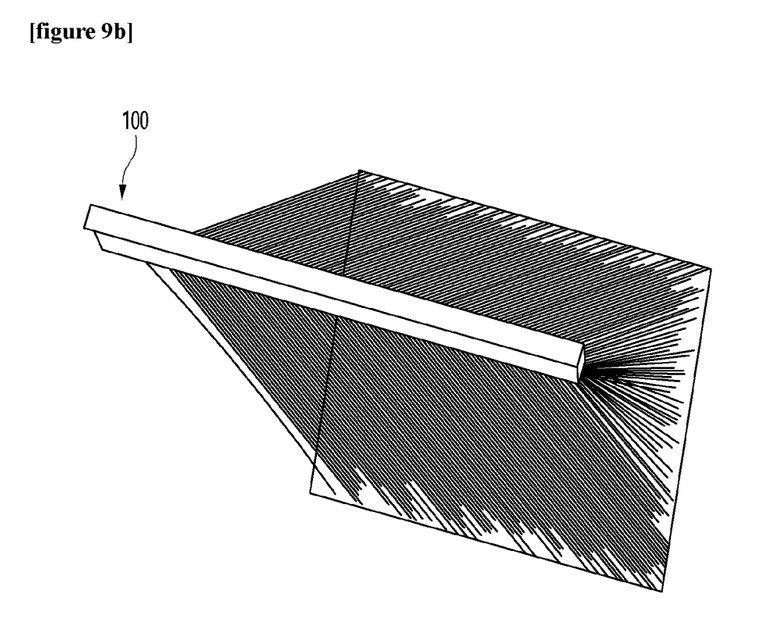
FIG. 9B is a three-dimensional view showing the progress of light of a lighting device according to an embodiment.
Figure 9C:
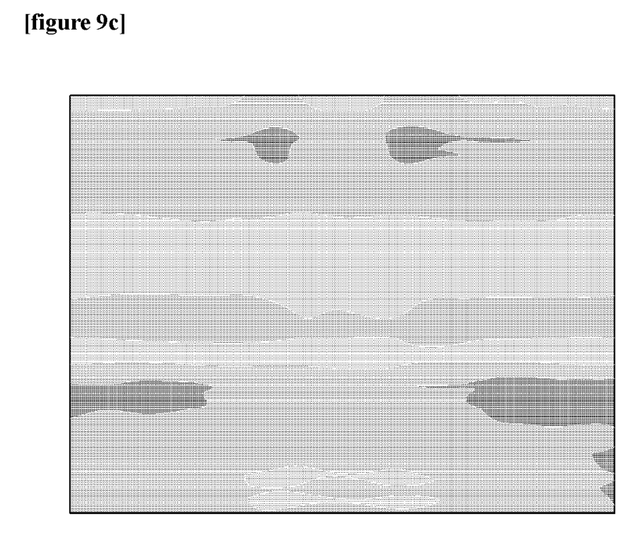
FIG. 9C shows an illuminance distribution of a lighting device according to an embodiment.

As shown in FIGS. 9A, 9B, and 9C, line beams formed by each light source module 110 are combined in the horizontal direction to obtain light having a large area size.

In addition, since the lower side, center and upper side of the line beam all have the same or similar illuminance distribution, light having a uniform illuminance distribution may be obtained by horizontally arranging the plurality of light source modules 110.

Meanwhile, although not shown, the light source 114 may be disposed below the modulator 112. In this case, the reflective film 118 of the modulator 112 may be disposed to face the light source 114 disposed below the modulator 112. Accordingly, the light emitted from the light source 114 may be irradiated upward, and may be modulated into a line beam in a vertical direction by the reflective film 118 of the modulator 112. Then, the modulated line beam may be transmitted forward.

Figure 4:
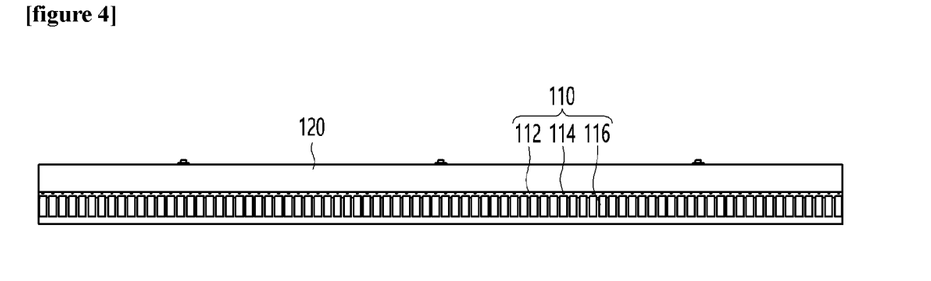
FIG. 4 is a view in which a diffusion unit is removed from FIG. 3.
Figure 5:
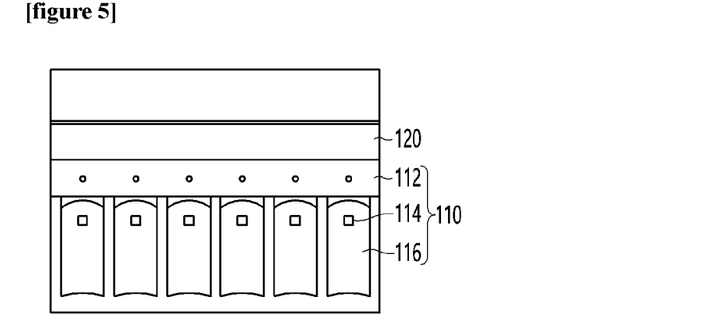
FIG. 5 is an enlarged plan view of a part of FIG. 3.
Figure 6:
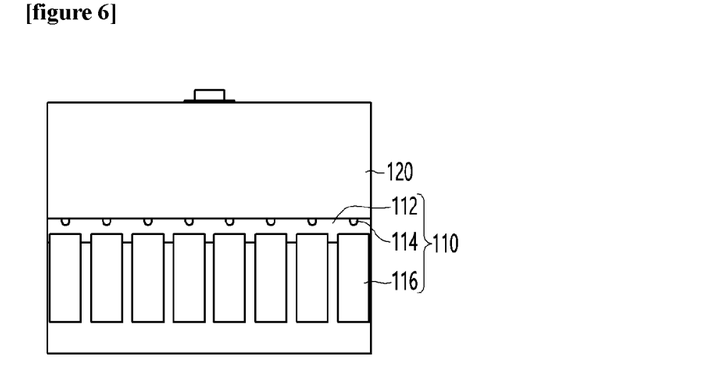
FIG. 6 is an enlarged front view of a part of FIG. 3.

FIG. 4 is a view in which a diffusion unit is removed from FIG. 3. FIG. 5 is an enlarged plan view of a part of FIG. 3. FIG. 6 is an enlarged front view of a part of FIG. 3.

Referring to FIGS. 4 to 6, a plurality of light sources 114 may be disposed in the horizontal direction. The plurality of light sources 114 may be installed below the body 120.

A support member (112 in FIG. 2) may be installed below the body 120. For example, the support member 112 may have a major axis long in the horizontal direction. Although, in the following description, it will be described that the support member 112 has a long major axis, the support member 112 may include a plurality of sub support members separated from each other.

A plurality of modulators 116 may be disposed in the horizontal direction. The plurality of modulators 116 may be installed on the support member 112.

In this case, one light source module 110 may be defined by the support member 112, the light source 114, and the modulator 116. Accordingly, the plurality of light source modules 110 may be arranged in an array in the horizontal direction. Since the support member 112 has a long major axis, the support member 112 may be shared by the light source modules 110.

The light sources 114 of the plurality of light source modules 110 may be disposed to be spaced apart from each other in the horizontal direction. The modulators 116 of the plurality of light source modules 110 may be disposed adjacent to each other in the horizontal direction. Although, in the drawings, the modulators 116 of the plurality of light source modules 110 are illustrated as being spaced apart from each other, the modulators 116 may be disposed in contact with each other.

The modulator 116 will be described in greater detail later.

Referring to FIGS. 2 and 3 again, the lighting device 100 according to the embodiment may further include a diffusion unit 130.

The housing 122 may fix the diffusion unit 130. That is, the diffusion unit 130 may be installed in the housing 122 and fixed by the housing 122.

The diffusion unit 130 may be disposed in front of the plurality of light source modules 110. For example, the diffusion unit 130 may be disposed in front of the plurality of modulators 116.

For example, the diffusion unit 130 may serve to diffuse the line beam transmitted from each of the plurality of modulators 116.

Figure 10A:
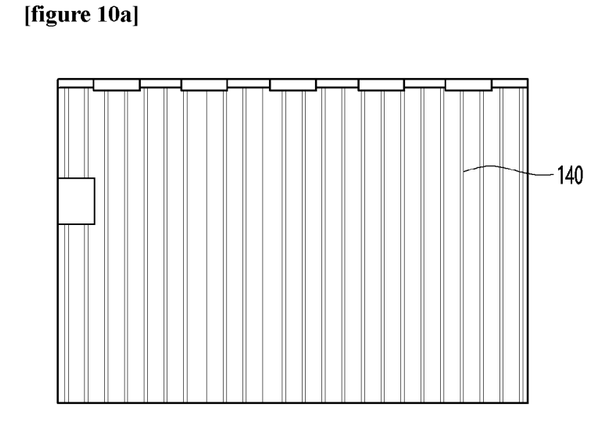
FIG. 10a shows vertical spot.

If the diffusion unit 130 is not provided, a defect such as a longitudinal (or vertical) spotted pattern 140 may occur as shown in FIG. 10A. It is assumed that this is caused by the characteristics of the line beam modulated by each modulator 116.

Figure 10B:
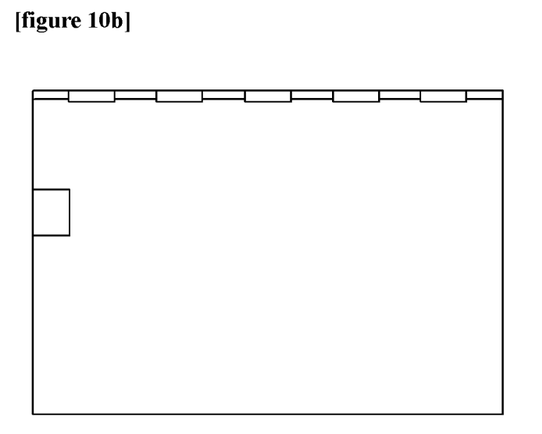
FIG. 10B shows a state in which the vertical spot is removed.

When the diffusion unit 130 is provided as in the embodiment, as shown in FIG. 10B, a defect such as the longitudinal spotted pattern 140 is prevented. Thus, there is no such defect, and light having a large area size and a uniform illuminance distribution may be obtained such that it can be widely applied to various industrial fields.

Figure 11:
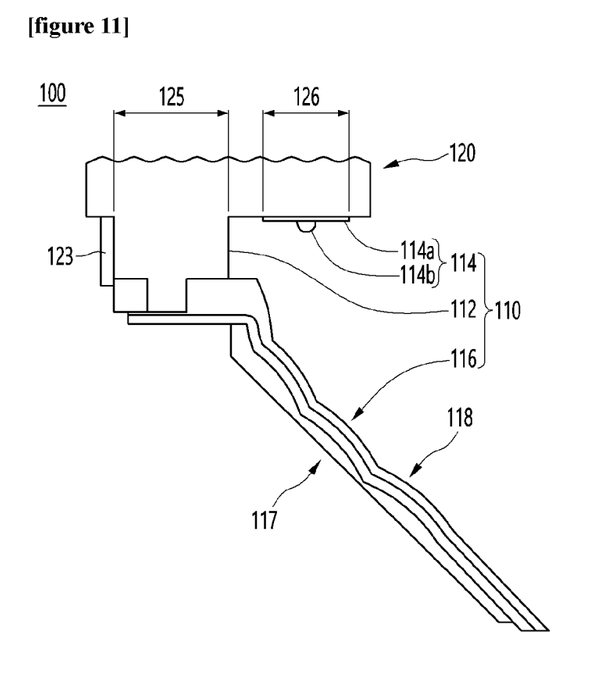
FIG. 11 is an enlarged side view of the lighting device of FIG. 2.

FIG. 11 is an enlarged side view of the lighting device of FIG. 2. FIG. 12 is an exploded view of the lighting device of FIG. 2.

Referring to FIGS. 11 and 12, the first region 125 and the second region 126 may be defined below the body 120. The support member 112 may be installed in the first region 125, and the light source 114 may be installed in the second region 126.

A guide member 123 may be provided below the body 120. The guide member 123 may be provided adjacent to the first region 125. The guide member 123 may serve to guide the support member 112 so that the support member 112 is installed at a fixed position when the support member 112 is installed in the first region 125.

For example, at least one protrusion 113 protruding downwardly may be provided on a portion of a lower side of the support member 112. For example, at least one groove 116a may be provided in a portion of an upper side of a fastening part (119 of FIG. 13) of the modulator 116. When the support member 112 and the modulator 116 are fastened, the protrusion 113 of the support member 112 is inserted into the groove 116a of the modulator 116, so that the modulator 116 may be fixed to the support member 112.

Figure 13:
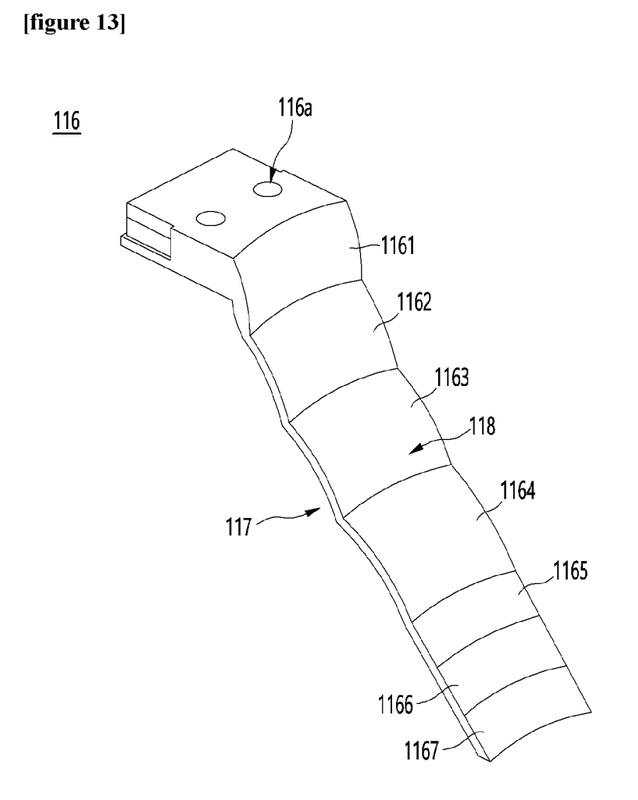
FIG. 13 is a perspective view showing a modulator according to an embodiment.

For example, the fastening part 119 of the modulator 116 may be installed below the support member 112 using a fastening means such as a bolt.

The size of the fastening part 119 of the modulator 116 may be, for example, larger than that of the support member 112, but is not limited thereto. Since the entire region of the lower side of the support member 112 is fixed in contact with the upper side of the fastening part 119 of the modulator 116, the modulator 116 may be fastened to the support member 112 with stronger fastening force.

The light source 114 may have a single unit including the printed circuit board 114a and the light emitting element 114b. The light source 114 may be installed in the second region 126. That is, the printed circuit board 114a may be coupled to the second region 126. Since the entire region of the printed circuit board 114a is fixed in contact with the second region 126, the light source 114 may be fastened to the body 120 with stronger fastening force.

The modulator 116 may be installed on the support member 112 such that one side of the modulator faces the light source 114 in the vertical direction.

The modulator 116 may include a fastening part 119 and a plurality of curved surfaces 1161 to 1167 extending from the fastening part 119, as shown in FIG. 13.

For example, one side of the modulator 116 may be further spaced apart from the light source 114 than the other side of the modulator 116. Specifically, among the plurality of curved surfaces 1161 to 1167, the curved surface 1167 furthest from the fastening part 119 may be further spaced apart from the light source 114 than the curved surface 1161 in contact with the fastening part 119.

For example, the fastening part 119 may have a parallel surface in the horizontal direction. For example, the plurality of curved surfaces 1161 to 1167 may be disposed in a direction inclined with respect to the fastening part 119, that is, in an inclined direction. Accordingly, the arrival distances and incident angles of the light emitted from the light source 114 to each of the plurality of curved surfaces 1161 to 1167 may be different.

Although the first to seventh curved surfaces 1161 to 1167 are illustrated in the drawing, more or fewer curved surfaces may be provided.

For example, the second curved surface 1162 may be disposed further away from the light source 114 than the first curved surface 1161, and the third curved surface 1163 may be disposed further away from the light source 114 than the second curved surface 1162. The fourth curved surface 1164 may be disposed further away from the light source 114 than the third curved surface 1163, and the fifth curved surface 1165 may be disposed further away from the light source 114 than the fourth curved surface 1164. The sixth curved surface 1166 may be disposed further away from the light source 114 than the fifth curved surface 1165, and the seventh curved surface 1167 may be disposed further away from the light source 114 than the sixth curved surface 1166.

The plurality of curved surfaces 1161 to 1167 may have different sizes. For example, the size of the curved surface 1161 adjacent to the fastening part 119 may be larger than that of the curved surface 1167 furthest away from the fastening part 119.

Figure 14:
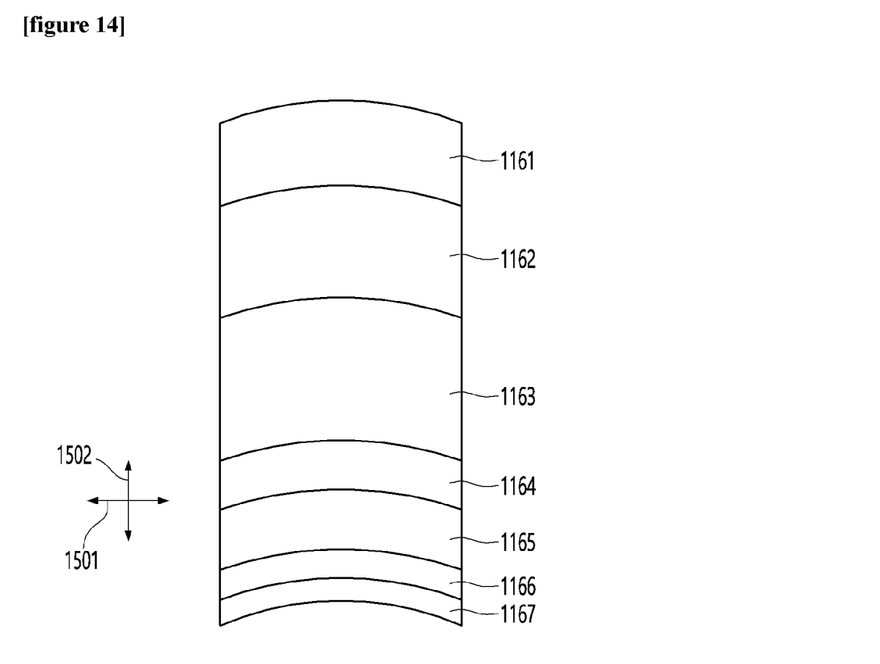
FIG. 14 is a front view showing a modulator according to an embodiment.
Figure 15:
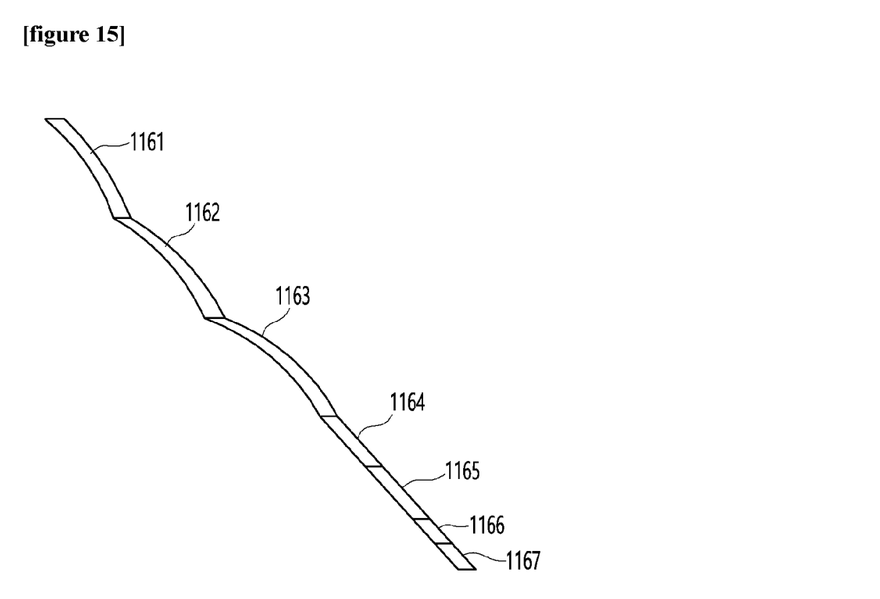
FIG. 15 is a side view showing a modulator according to an embodiment.

As shown in FIGS. 14 and 15, each of the plurality of curved surfaces 1161 to 1167 may have a first radius of curvature in a minor axis direction 1501 of the modulator 116 and have a second radius of curvature in a major axis direction 1502 of the modulator 116. For example, the first radius of curvature may have a negative radius of curvature, and the second radius of curvature may be a positive radius of curvature. The negative radius of curvature may mean a downward concave radius of curvature when the modulator 116 is viewed from above or a downward convex radius of curvature when the modulator 116 is viewed from below. The positive radius of curvature may mean an upward convex radius of curvature when the modulator 116 is viewed from above or an upward concave radius of curvature when the modulator 116 is viewed from below.

For example, the first radius of curvature of each of the plurality of curved surfaces 1161 to 1167 may be the same, but is not limited thereto. For example, the second radius of curvature of each of the plurality of curved surfaces 1161 to 1167 may be different, but is not limited thereto.

Meanwhile, some of the plurality of curved surfaces 1161 to 1167 may be included in a first group 1100, and the other curved surfaces may be included in a second group 1200. The first group 1100 may be a group more closely adjacent to the light source 114 than the second group 1200. The first group 1100 may be a group more closely adjacent to the fastening part 119 than the second group 1200.

For example, the first to fourth curved surfaces 1161 to 1164 may be included in the first group 1100, and the fifth to seventh curved surfaces 1165 to 1167 may be included in the second group 1200.

For example, the second radius of curvature of each of the first to fourth curved surfaces 1161 to 1164 included in the first group 1100 is greater than that of the fifth to seventh curved surfaces 1165 to 1167 included in the second group 1200.

For example, the second radius of curvature of each of the first to fourth curved surfaces 1161 to 1164 included in the first group 1100 may be different, but is not limited thereto. For example, the radius of curvature of each of the fifth to seventh curved surfaces 1165 to 1167 included in the second group 1200 may be zero or close to zero.

For example, each of the plurality of curved surfaces 1161 to 1167 may reflect light incident from the light source 114 as a sub-line beam in the vertical direction. The plurality of sub-line beams may overlap to form a line beam in the vertical direction.

Accordingly, the first to fourth curved surfaces 1161 to 1164 included in the first group 1100 may allow the light incident from the light source 114 to be uniformly transmitted to each region in the vertical direction of the line beam. In addition, the fifth to seventh curved surfaces 1165 to 1167 included in the second group 1200 serve to transmit the light incident from the light source 114 to each region of the line beam, thereby enabling overall balance of the line beam.

Therefore, light having a uniform illuminance distribution and a large area size may be obtained by the first to fourth curved surfaces 1161 to 1164 included in the first group 1100 and the fifth to seventh curved surfaces 1165 to 1167 included in the second group 1200.

As described above, the plurality of curved surfaces 1161 to 1167 may have different radii of curvature in the minor axis direction 1501 and the major axis direction 1502 of the modulator 116, and may have different sizes. Accordingly, the plurality of curved surfaces 1161 to 1167 may have irregular surfaces arranged in a line. For example, each of the plurality of curved surfaces 1161 to 1167 may have a freeform shape. For example, each of the plurality of curved surfaces 1161 to 1167 may have a polynomial surface.

Due to the peculiar shape of the modulator 116 in the light source module 110 as described above, the modulator 116 may modulate the light of the light source 114 into a line beam in the vertical direction. In this case, the illuminance of each of the lower side, center, and upper side of the line beam may be uniform.

Accordingly, by arranging the plurality of light source modules 110 each forming a line beam in the horizontal direction, it is possible to easily obtain light having a uniform illuminance distribution and a large area size.

Meanwhile, the modulator 116 may include a reflector.

For example, the modulator 116 may include a support substrate 117 and a reflective film 118.

The support substrate 117 may serve to entirely support the modulator 116. For example, the support substrate 117 may be formed of a plastic material having excellent support strength, but is not limited thereto.

The upper surface of the support substrate 117 may have a plurality of irregular curved surfaces 1161 to 1167 arranged in a line.

The reflective film 118 may be disposed on the support substrate 117 to correspond to the top surface of the support substrate 117. For example, the reflective film 118 may have a shape corresponding to the plurality of curved surfaces 1161 to 1167. Accordingly, since the support substrate 117 has the plurality of curved surfaces 1161 to 1167, the reflective film 118 may also have the plurality of curved surfaces 1161 to 1167.

The reflective film 118 may be a coating layer coated on the support substrate 117. The reflective film 118 may be formed of a material having excellent reflective properties. For example, the reflective film 118 may be formed of a metal material such as aluminum (Al), but is not limited thereto.

The lighting device 100 described above may be applied to various industrial fields.

Hereinafter, as an example, an equipment system having a lighting device used to inspect a Time of flight (Tot) module will be described, but the embodiment is not limited thereto.

[Equipment System]

Figure 16:
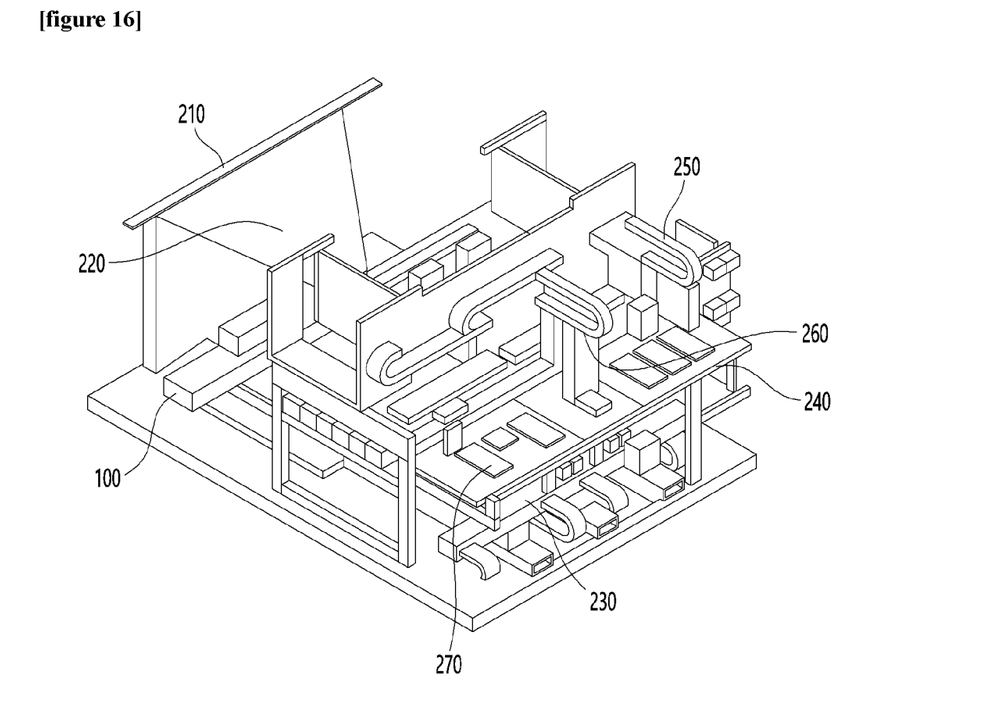
FIG. 16 shows an equipment system according to an embodiment.

FIG. 16 shows an equipment system according to an embodiment.

Referring to FIG. 16, the equipment system 200 according to the embodiment may include a lighting device 100, a socket 220 and a chart plate 210. The equipment system 200 according to the embodiment may include more components.

The lighting device 100 may be the aforementioned lighting device (FIGS. 1 to 15).

A socket 220 may seat an object to be inspected. For example, the object may be a Tof module. The Tof module may include a light emitting unit that emits light and a light receiving unit that receives light reflected back from a subject. The Tof module may detect a distance from the subject by measuring a time required for the light emitted from the light emitting unit to be reflected from the subject and received.

Distortion may be generated by a lens provided in the light receiving unit of the Tof module.

The equipment system 200 according to the embodiment may be an equipment for compensating for distortion of a lens provided in the light receiving unit of the Tof module and inspecting a defect of the Tof module.

Figure 17:
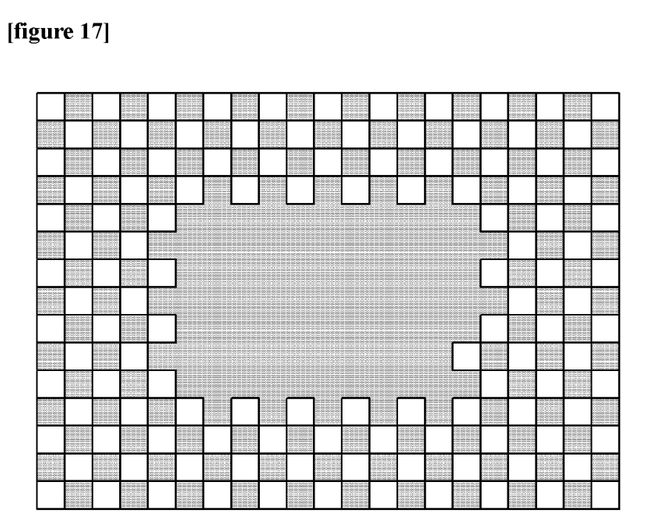
FIG. 17 shows a pattern provided in a chart plate.

The chart plate 210 may be provided with a preset pattern as shown in FIG. 17. Such a pattern is usually invisible, and may be easily seen when the light emitted from the lighting device 100 illuminates the chart plate 210.

An operation of the equipment system 200 according to the embodiment will be described.

First, the lighting device 100 is operated, so that light having a uniform illuminance distribution and a large area size from the lighting device 100 may be emitted to the chart plate 210.

The entire region of the pattern provided on the chart plate 210 may be seen uniformly and well by the light.

After the object is seated in the socket 220, the light emitted from the lighting device 100 according to the pattern provided in the chart plate 210 is received as brightness information, and the distortion of the lens provided in the light receiving unit of the Tof module may be compensated for based on the brightness information by a controller (not shown). That is, light having a uniform illuminance distribution and a large area size emitted from the lighting device 100 is transmitted to the entire region of the chart plate 210, and brightness information differently reflected according to the pattern provided in the chart plate 210 may be received by the light receiving unit of the Tof module. The brightness information may be light emitted from the lighting device 100 and reflected by the pattern of the chart plate 210. Since the light emitted from the lighting device 100 is irradiated with a uniform illuminance distribution to the entire region of the chart plate, the brightness information may include reflected light of the pattern provided in the entire region of the chart plate 210.

The equipment system 200 may perform control to compensate for distortion of the lens provided in the light receiving unit of the Tof module based on the brightness information received by the light receiving unit of the Tof module.

In addition, the equipment system 200 may check whether the Tof module is defective by evaluating the degree of compensation based on the compensated result.

The Tof module in which the distortion of the lens provided in the light receiving unit is compensated for by the equipment system 200 may be mounted in various electronic devices.

On the other hand, the equipment system 200 according to the embodiment may further include a stacker 230, an input tray 240, a loading arm 250, an unloading arm 260 and an output tray 270.

The stacker 230 may be a drawer in which a plurality of trays are placed.

The input tray 240 may accommodate Tof modules to be supplied to the socket 220.

The loading arm 250 may pick up the Tof module on the input tray 240 and seat it in the socket 220.

The unloading arm 260 may take out the Tof module, which has been inspected, from the socket 270 and accommodate it to the output tray 270.

The output tray 270 may accommodate the Tof module taken out of the socket 220.

The above detailed description should not be construed as restrictive in all respects and should be considered as exemplary. The scope of the embodiments should be determined by a reasonable interpretation of the appended claims, and all modifications within the equivalent scope of the embodiments are included in the scope of the embodiments.

INDUSTRIAL AVAILABILITY

The embodiment may be applied to an industrial field requiring light having a uniform illuminance distribution and a large area size. The embodiment may be applied to an inspection apparatus, a projection display apparatus, and the like.

What is claimed is:

1. A light source module comprising:
a light source configured to emit light; and
a modulator disposed below the light source to modulate the emitted light into a line beam in a vertical direction,
wherein the modulator has a plurality of curved surfaces,
wherein each of the plurality of curved surfaces has a first radius of curvature in a minor direction of the modulator and has a second radius of curvature in a major direction of the modulator,
wherein the first radius of curvature is a negative radius of curvature, and
wherein the second radius of curvature is a positive radius of curvature.

2. The light source module of claim 1, wherein one side of the modulator is further spaced apart from the light source than the other side of the modulator.

3. The light source module of claim 1, wherein the plurality of curved surfaces have different sizes.

4. The light source module of claim 1, wherein a curved surface adjacent to one side of the modulator is further spaced apart from the light source.

5. The light source module of claim 1, wherein each of the plurality of curved surfaces has a freeform shape.

6. The light source module of claim 5, wherein each of the plurality of curved surfaces has a polynomial surface.

7. The light source module of claim 1,
wherein the first radius of curvature of each of the plurality of curved surfaces is the same, and
wherein the second radius of curvature of each of the plurality of curved surfaces is different.

8. The light source module of claim 1,
wherein some of the plurality of curved surfaces are included in a first group and the other curved surfaces are included in a second group,
wherein the first group is adjacent to the light source, and
wherein the second radius of curvature of each of some curved surfaces included in the first group is greater than that of each of the other curved surfaces included in the second group.

9. The light source module of claim 8, wherein the second radius of curvature of each of some curved surfaces included in the first group is different.

10. The light source module of claim 9, wherein the second radius of curvature of each of the other curved surfaces included in the second group is close to zero.

11. The light source module of claim 1, wherein the plurality of curved surfaces reflects the emitted light as sub line beams in the vertical direction.

12. The light source module of claim 11, wherein the sub line beams reflected from the plurality of curved surfaces overlap each other to form the line beam.

13. The light source module of claim 1, wherein the modulator includes a reflector.

14. The light source module of claim 13, wherein the modulator comprises:
a support substrate having a plurality of irregular curved surfaces arranged in a line; and
a reflective film corresponding to the plurality of curved surfaces and disposed on the support substrate.

15. A lighting device comprising:
a body; and
a plurality of light source modules disposed below the body and arranged in an array in a horizontal direction,
wherein the light source module comprises:
a support member installed in a first region below the body;
a light source installed in a second region below the body to emit light in a downward direction; and
a modulator installed below the support member to modulate the emitted light into a line beam in a vertical direction.

16. The lighting device of claim 15, wherein the modulator has a plurality of irregular curved surfaces arranged in a line.

17. The lighting device of claim 15, further comprising a diffusion unit disposed in front of the plurality of light source modules.

18. An equipment system comprising the lighting device of claim 15.

* * * * *